United States Patent
Listro

(10) Patent No.: US 11,661,128 B2
(45) Date of Patent: May 30, 2023

(54) DOLLY FOR A WATER VESSEL

(71) Applicant: David Listro, Clinton, CT (US)

(72) Inventor: David Listro, Clinton, CT (US)

(*) Notice: Subject to any disclaimer, the term of this patent is extended or adjusted under 35 U.S.C. 154(b) by 48 days.

(21) Appl. No.: 17/551,032

(22) Filed: Dec. 14, 2021

(65) Prior Publication Data

US 2022/0185403 A1 Jun. 16, 2022

Related U.S. Application Data

(60) Provisional application No. 63/125,027, filed on Dec. 14, 2020.

(51) Int. Cl.
| | | |
|---|---|---|
| *B63C 13/00* | (2006.01) | |
| *B62B 5/00* | (2006.01) | |
| *B62D 63/06* | (2006.01) | |
| *B60D 1/00* | (2006.01) | |

(52) U.S. Cl.
CPC .......... *B62D 63/064* (2013.01); *B62B 5/0083* (2013.01); *B62D 63/065* (2013.01); *B63C 13/00* (2013.01); *B60D 2001/005* (2013.01); *B62B 2202/403* (2013.01)

(58) Field of Classification Search
CPC .... B62D 63/064; B62D 63/065; B62D 21/14; B62C 13/00; B62B 1/125; B62B 5/0083; B62B 2202/403; B60D 2001/005; B63C 13/00
See application file for complete search history.

(56) References Cited

U.S. PATENT DOCUMENTS

| | | | | |
|---|---|---|---|---|
| 2,551,040 A | * | 5/1951 | Newell | B63C 13/00 114/344 |
| 2,709,084 A | * | 5/1955 | Nagaishi | B63C 13/00 280/47.32 |

(Continued)

FOREIGN PATENT DOCUMENTS

| | | | | |
|---|---|---|---|---|
| CA | 2290156 A1 | * | 5/2001 | ........... B62B 5/0083 |
| FR | 969340 A | * | 12/1950 | |

(Continued)

OTHER PUBLICATIONS

Seitech Tech Dinghy Dolly, Retrieved from Internet, Retrieved on Oct. 25, 2021 <URL: https://www.shopsoundboatworks.com/products/seitech-tech-dinghy-dolly?variant=39254113714245>.

*Primary Examiner* — Steve Clemmons

(57) ABSTRACT

A dolly for a water vessel is an apparatus that facilitates the transportation of a water vessel on land. The apparatus serves as a universal attachment for water vessels. The apparatus includes left brace assembly, a right brace assembly, a connector bar, a first roller assembly, and a second roller assembly. The left brace assembly and the right brace assembly attach onto a transom of a water vessel. The left brace assembly and the right brace assembly may be adjusted to accommodate transoms of varying heights. The connector bar mounts the left brace assembly with the right brace assembly, thereby positioning the first roller assembly and the second roller assembly. The first roller assembly and the second roller assembly uplift the water vessel and rolls the water vessel across the ground. The apparatus further includes a cradle mechanism which further supports a paddleboard or a kayak.

20 Claims, 5 Drawing Sheets

(56) References Cited

U.S. PATENT DOCUMENTS

| | | | | |
|---|---|---|---|---|
| 2,970,846 | A * | 2/1961 | Boston | B63C 13/00 280/63 |
| 3,093,386 | A * | 6/1963 | Case | B62B 1/12 280/42 |
| 3,301,571 | A * | 1/1967 | Malcolm | B63C 13/00 280/47.32 |
| 3,361,441 | A * | 1/1968 | Mcrae | B63C 13/00 280/47.32 |
| 3,406,985 | A * | 10/1968 | Ballenger | B63C 13/00 280/646 |
| 3,462,781 | A * | 8/1969 | Olvera | B63C 13/00 114/344 |
| 3,616,474 | A * | 11/1971 | Cyril | B63C 13/00 280/47.32 |
| 4,230,335 | A | 10/1980 | Glassmeyer | |
| 4,392,665 | A * | 7/1983 | Miller | B63C 13/00 114/344 |
| 4,434,992 | A * | 3/1984 | Beach-Thomas | B63C 13/00 114/344 |
| 4,550,925 | A * | 11/1985 | McDonough | B63C 13/00 114/344 |
| 5,232,233 | A * | 8/1993 | Jedora | B63C 13/00 280/47.131 |
| 5,320,371 | A * | 6/1994 | Levad | B62K 27/02 280/42 |
| 5,338,050 | A | 8/1994 | Haire | |
| 5,425,326 | A * | 6/1995 | Tibbedeaux | B63C 13/00 114/344 |
| 5,547,206 | A | 8/1996 | Hodges | |
| 5,755,451 | A * | 5/1998 | O'Connor | B63C 13/00 280/47.32 |
| 6,189,478 | B1 * | 2/2001 | Myers | B63C 13/00 114/344 |
| 6,824,155 | B1 * | 11/2004 | Heck | B63C 13/00 114/344 |
| 8,091,501 | B2 * | 1/2012 | Lazarevic | B63C 13/00 114/344 |
| 9,004,507 | B1 * | 4/2015 | Nunley | B62B 1/26 280/47.331 |
| 2009/0101437 | A1 * | 4/2009 | Abraham | E06C 7/08 16/29 |
| 2020/0130722 | A1 | 4/2020 | Gamache | |

FOREIGN PATENT DOCUMENTS

| | | | | |
|---|---|---|---|---|
| GB | 2368817 A * | 5/2002 | | B63B 7/04 |
| GB | 2511532 A * | 9/2014 | | B63C 13/00 |

* cited by examiner

FIG. 5

DOLLY FOR A WATER VESSEL

The current application claims a priority to the U.S. Provisional Patent application Ser. No. 63/125,027 filed on Dec. 14, 2020.

FIELD OF THE INVENTION

The present invention generally relates to water vessel equipment. More specifically, the present invention is a dolly for a water vessel.

BACKGROUND OF THE INVENTION

Water vessels are necessary for individuals to travel across a body water. However, transporting the water vessel from a car, a truck, or the like may be quite challenging. Not only does the size and the weight of the water vessel make the water vessel difficult to maneuver, but the ground and terrain between a car or a truck and the body of water is typically challenging. It is important to limit any direct contact between the ground and the exterior of the water vessel.

It is therefore an objective to alleviate the weight of a water vessel throughout transportation across land. The present invention allows a water vessel to be portable across land. The present invention serves as a universal attachment for a variety of water vessels. The present invention is easily installed, adjusted, and removed without damaging the integrity of the water vessel. Moreover, the present invention may remain attached with a water vessel while launched into a body of water and while the water vessel traverses across a body of water.

BRIEF DESCRIPTION OF THE DRAWINGS

FIG. 5 is a rear right exploded view of the present invention in the preferred configuration.

DETAILED DESCRIPTIONS OF THE INVENTION

All illustrations of the drawings are for the purpose of describing selected versions of the present invention and are not intended to limit the scope of the present invention.

Figure 1:
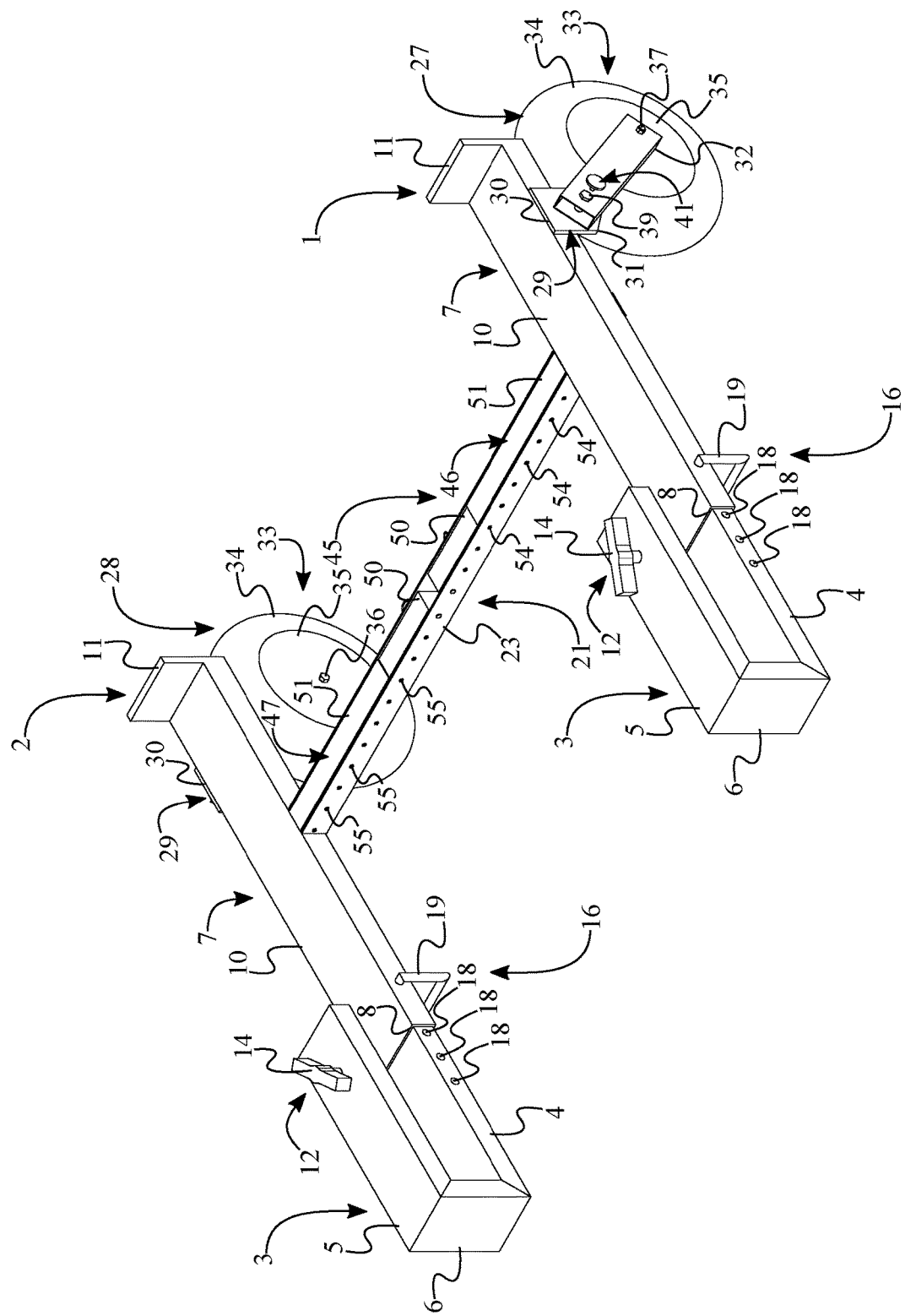
FIG. 1 is a front left perspective view of the present invention in a preferred configuration.
Figure 2:
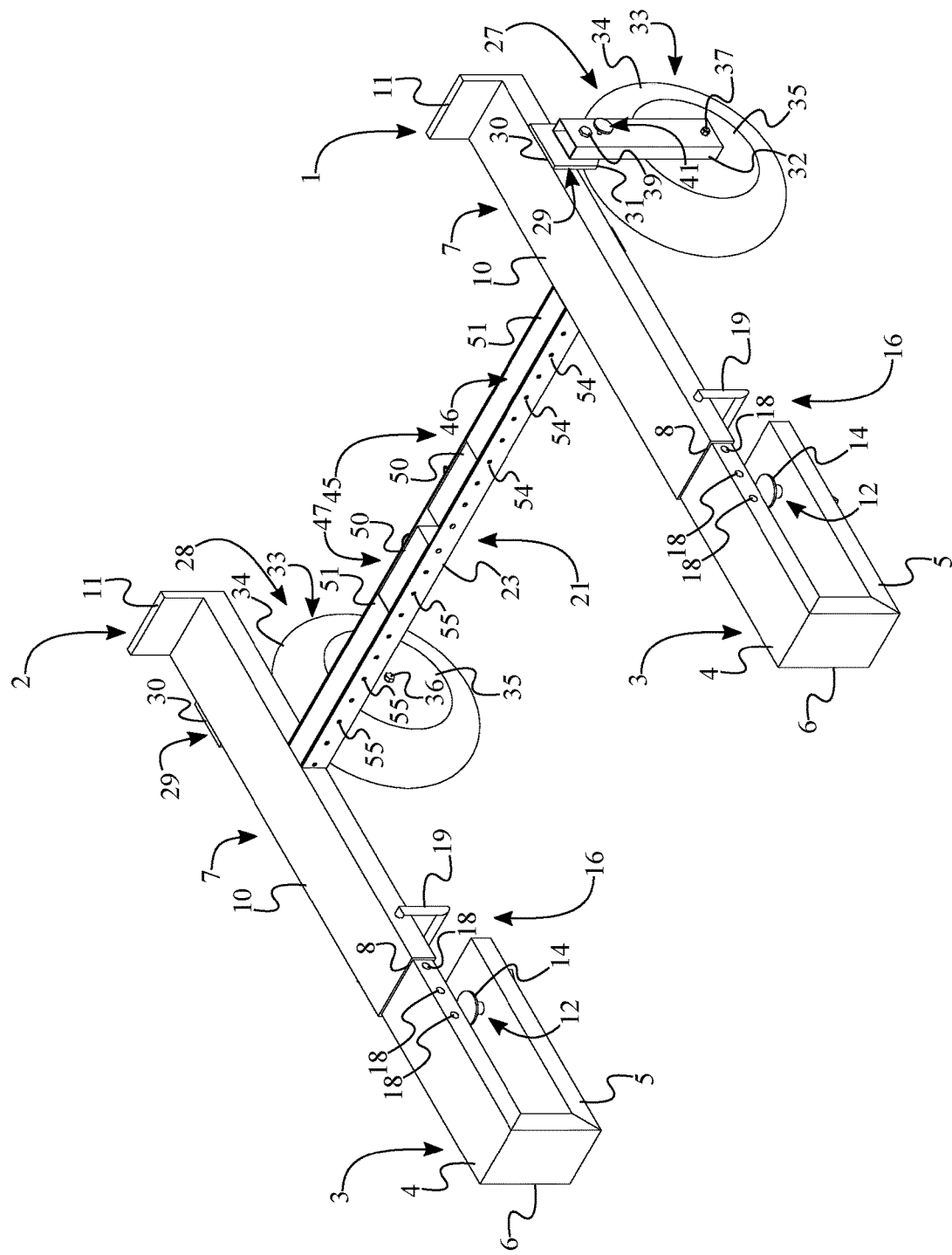
FIG. 2 is a front left perspective view of the present invention with a U-shaped bracket of a left brace assembly and a U-shaped bracket of a right brace assembly in an alternate configuration.
Figure 3:
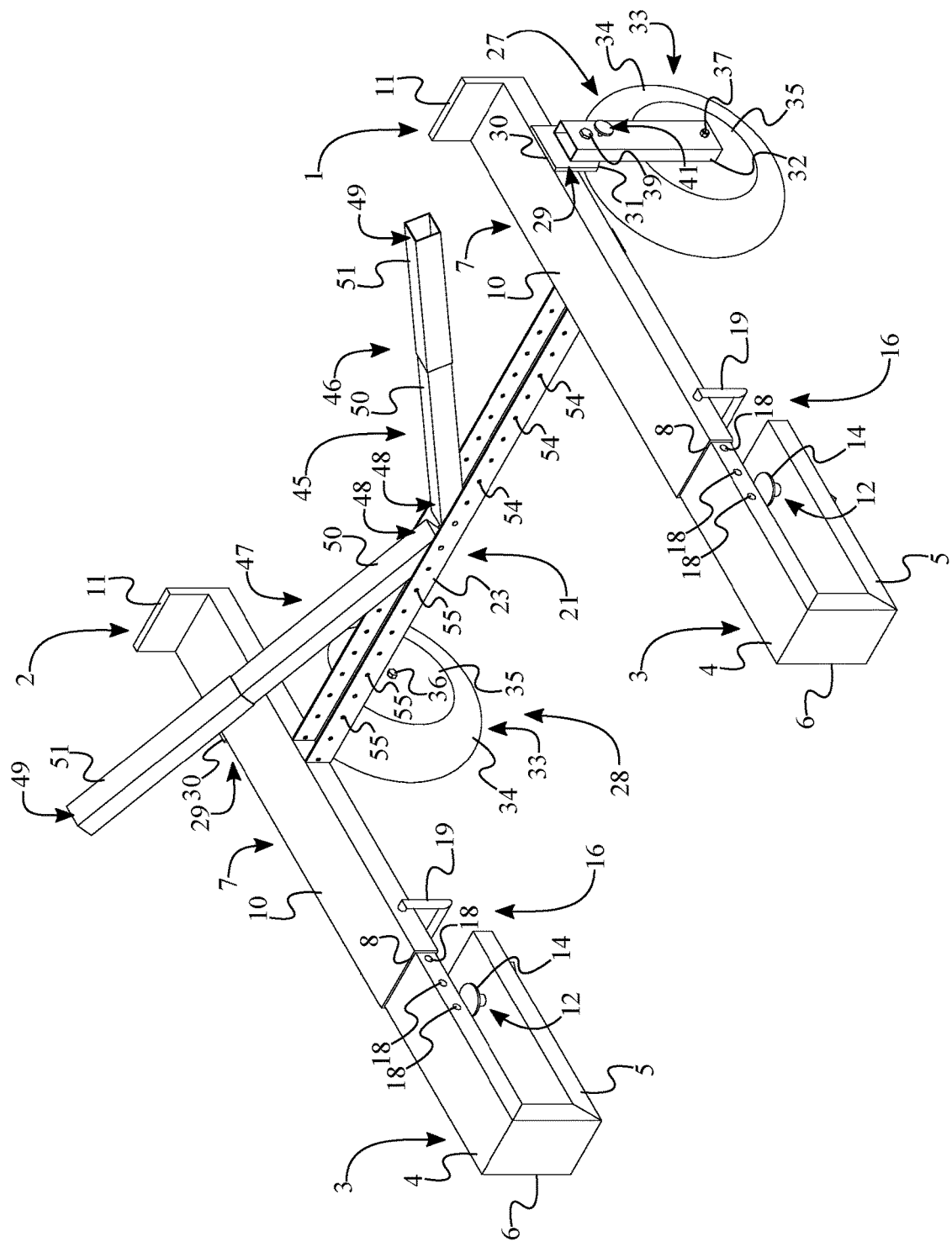
FIG. 3 is a front left perspective view of the present invention in the alternate configuration with a cradle mechanism fully extended and flipped out of a connector bar.
Figure 5:
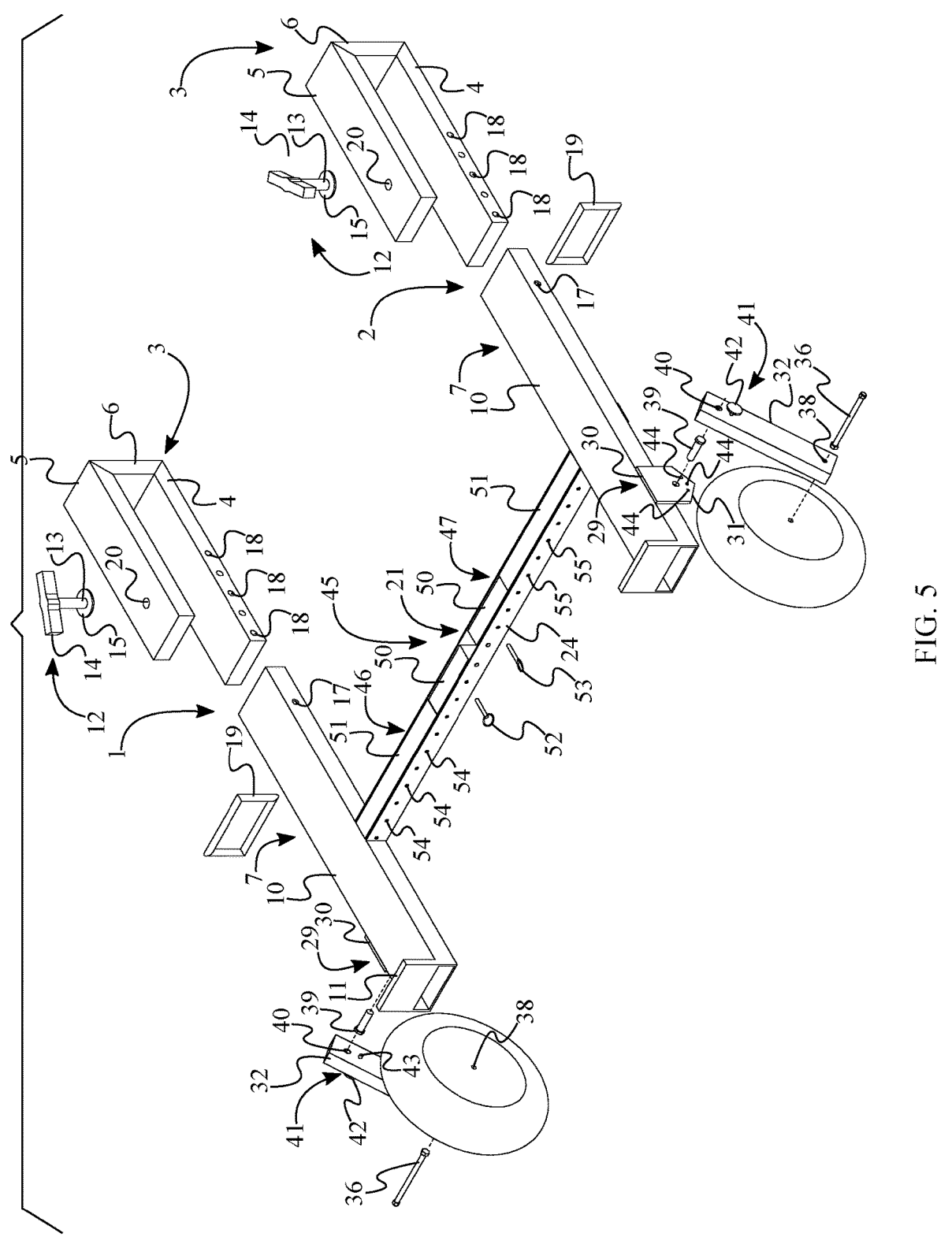

The present invention is a dolly for a water vessel. The present invention attaches with a water vessel without the need of any additional hardware or tools. The present invention may be attached to a variety of water vessels and serves as a universal attachment for water vessels. The present invention may remain connected with a water vessel throughout transportation to a body of water, while launched into the body of water, while traversing across the body of water, and while exiting the body of water. The present invention comprises a left brace assembly 1, a right brace assembly 2, a connector bar 21, a first roller assembly 27, and a second roller assembly 28, seen in FIG. 1, FIG. 2, FIG. 3, and FIG. 5. The left brace assembly 1 and the right brace assembly 2 latches around the transom of a water vessel. The left brace assembly 1 and the right brace assembly 2 each comprise a U-shaped bracket 3, an elongated support tube 7, and a stopper plate 11. The U-shaped bracket 3 and the stopper plate 11 latch around the transom. The elongated support tube 7 reinforces the transom and connected the U-shaped bracket 3 with the stopper plate 11. The left brace assembly 1 and the right brace assembly 2 are evenly positioned across the transom and remain connected to one another with the connector bar 21. Moreover, the connector bar 21 defines the position of the first roller assembly 27 and the second roller assembly 28 with the transom. The first roller assembly 27 and the second roller assembly 28 uplift and roll the water vessel across the ground. Moreover, the first roller assembly 27 and the second roller assembly 28 makes a water vessel portable over land. The first roller assembly 27 and the second roller assembly 28 each comprise a mounting plate 29, a leg 32, and a wheel assembly 33. The mounting plate 29 connects the leg 32 with the left brace assembly 1 and the right brace assembly 2, respectively. The leg 32 offsets the wheel assembly 33 with the mounting plate 29 so that the wheel assembly 33 may freely roll. The leg 32 also orients the wheel assembly 33 with the mounting plate 29, and consequently the elongated support tube 7. The wheel assembly 33 rolls the present invention, along with the attached water vessel, across the ground.

Figure 4:
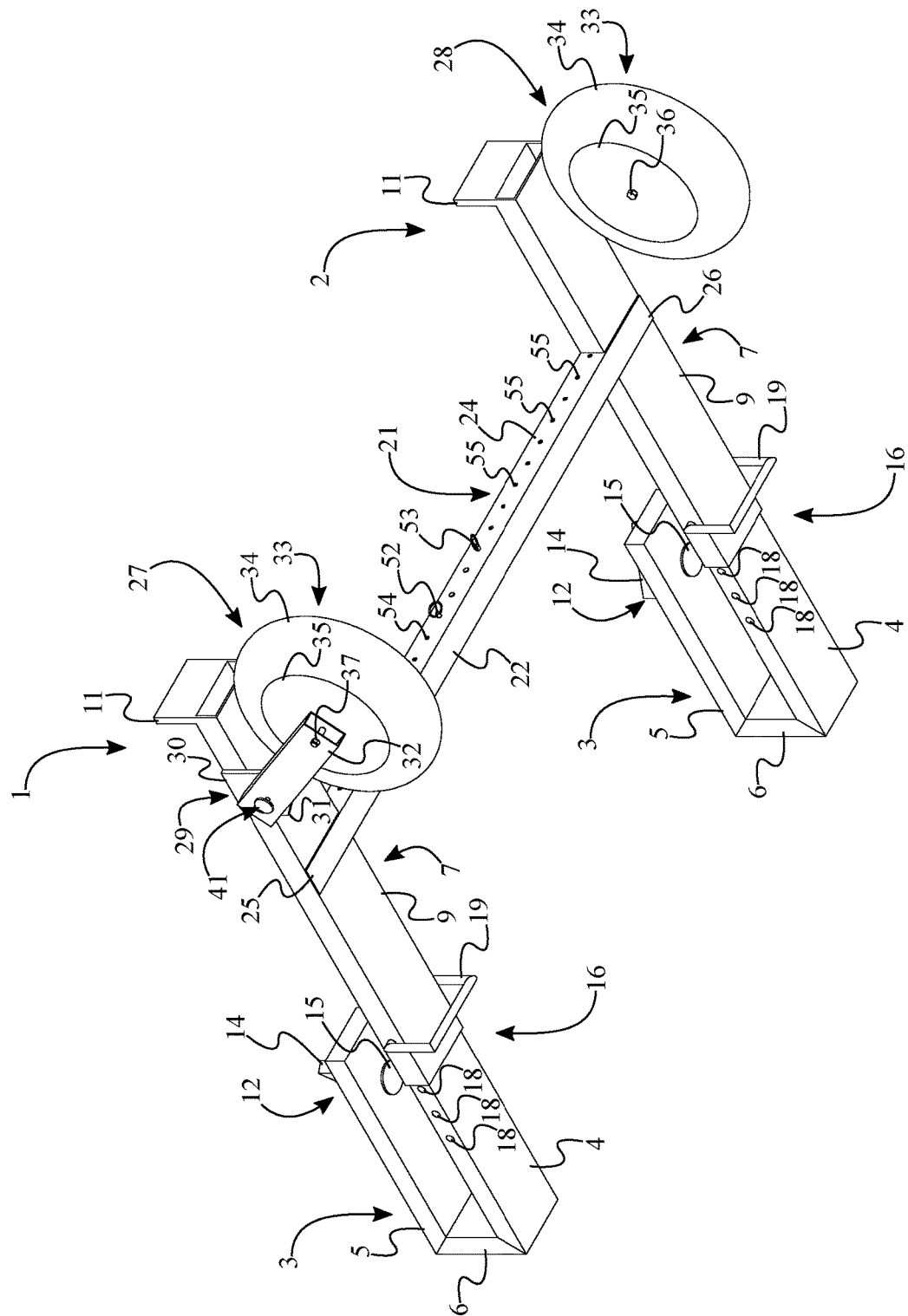
FIG. 4 is a rear left perspective view of the present invention in the preferred configuration.

The overall configuration of the aforementioned components allows the present invention to serve as a universal attachment for a variety of water vessels. In order to evenly balance the transom with the ground, the left brace assembly 1 is positioned offset from the right brace assembly 2, seen in FIG. 1, FIG. 2, FIG. 3, FIG. 4, and FIG. 5. The connector bar 21 is fixed in between the left brace assembly 1 and the right brace assembly 2, thereby securing the connection and distance between the left brace assembly 1 and the right brace assembly 2. In order to accommodate the height of the transom, the U-shaped bracket 3 is terminally mounted with the elongated support tube 7, and the stopper plate 11 is terminally fixed with the elongated support tube 7, opposite the U-shaped bracket 3. The U-shaped bracket 3 is preferably slidably engaged into the elongated support tube 7 to accommodate various heights of different transoms. Moreover, this arrangement allows the U-shaped bracket 3 to be easily removed and attached with transoms of different water vessels. As the transom, and the rest of the water vessel, presses on the stopper plate 11 while being rolled across the ground, the mounting plate 29 of the first roller assembly 27 is laterally fixed with the elongated support tube 7 of the left brace assembly 1, offset from the stopper plate 11 of the left brace assembly 1. Likewise, the mounting plate 29 of the second roller assembly 28 is laterally fixed with the elongated support tube 7 of the right brace assembly 2, offset from the stopper plate 11 of the right brace assembly 2. The leg 32 is hingedly connected with the mounting plate 29 so that the present invention may remain attached with the transom while rolling across the ground, being launched into a body of water, traversing across the body of water, and exiting the body of water. In the preferred embodiment of the present invention, the leg 32 remains uninhibited by the left brace assembly 1 and the right brace assembly 2, respectively, as the leg 32 is positioned adjacent with the mounting plate 29, opposite the elongated support tube 7. Moreover, the leg 32 is able to be placed into different configurations in order to accommodate the water vessel on the ground or in a body of water. The wheel assembly 33 is positioned opposite to the mounting plate 29 along the leg 32, thereby uplifting the water vessel from the ground and limiting any contact between the water vessel with the ground for smooth and continuous transport. The water vessel is easily rolled with the present invention as the wheel assembly 33 is rotatably mounted with the leg 32.

In order for the present invention to effectively latch onto a transom, the left brace assembly 1 and the right brace assembly 2 may each further comprise a swivel screw clamp 12 and a locking mechanism 16, seen in FIG. 1, FIG. 2, FIG. 3, FIG. 4, and FIG. 5. Furthermore, the U-shaped bracket 3 may comprise a fixed bar 4, a free bar 5, and a connecting bar 6. Furthermore, the elongated support tube 7 may comprise an open-end rim 8. The swivel screw clamp 12 presses the transom against the fixed bar 5 thereby locking the transom within the U-shaped bracket 3. The locking mechanism 16 secures the free bar 5 within the elongated support tube 7. The fixed bar 4 attaches the U-shaped bracket 3 with the elongated support tube 7. Moreover, the fixed bar 4 extends the overall length of the U-shaped bracket 3 across the transom. The free bar 5 wraps the U-shaped bracket 3 around the top edge of the transom with the connecting bar 6. The connecting bar 6 attaches the free bar 5 with the fixed bar 4. In order to define a U-shape, the fixed bar 4 is terminally fixed with the connecting bar 6, and the free bar 5 is terminally fixed with the connecting bar 6, opposite the fixed bar 4. In the preferred embodiment of the present invention, the free bar 5 is oriented towards the stopper plate 11 about the elongated support tube 7 in order to for the left brace assembly 1 and the right brace assembly 2, respectively, to latch onto the transom. In alternate configurations, the free bar 5 is oriented opposite of the stopper plate 11 about the elongated stopper tube in order to support and uphold a variety of other water sport supplies and water sporting goods. The open-end rim 8 is positioned opposite the stopper plate 11 along the elongated support tube 7, and the fixed bar 4 is positioned into the open-end rim 8 so that the fixed bar 4 may slide into and out of the elongated support tube 7. In order to lock transoms with varying thicknesses, the swivel screw clamp 12 is integrated into the U-shaped bracket 3, again allowing the present invention to attach with transoms of different water vessels without damaging the transoms. The stopper plate 11 and the connecting bar 6 remains pressed against the edges of the transom, effectively latching the U-shaped bracket 3 with the transom, as the fixed bar 4 is operatively coupled with the elongated support tube 7 by the locking mechanism 16, wherein the locking mechanism 16 is used to selectively lock the fixed bar 4 in place within the elongated support tube 7 at the desired position.

In order to adjust the overall length of the left brace assembly 1 and the right brace assembly 2, the locking mechanism 16 may comprise a first hole 17, a plurality of length-adjusting holes 18, and a first lock pin 19, seen in FIG. 1, FIG. 2, FIG. 3, FIG. 4, and FIG. 5. The first hole 17 allows the first lock pin 19 to traverse through the elongated support tube 7 while preserving the structural integrity of the elongated support tube 7. Similarly, the plurality of length-adjusting holes 18 allows the first lock pin 19 to traverse through the fixed bar 4 while preserving the structural integrity of the fixed bar 4. The first lock pin 19 locks the fixed bar 4 within the elongated support tube 7, defining the overall length of the left brace assembly 1 and the right brace assembly 2, respectively. In the preferred embodiment of the present invention, the first lock pin 19 is a clevis pin. It is understood that alternate embodiments of the present invention comprise varying types of first lock pins. In order for the first lock pin 19 to freely and continuously traverse through the elongated support tube 7 and the fixed bar 4, the first hole 17 laterally traverses through the elongated support tube 7, and the plurality of length-adjusting holes 18 laterally traverses through the fixed bar 4. The stopper plate 11 and the connecting bar 6 may firmly press against the transom regardless of the height as the plurality of length-adjusting holes 18 is distributed along the fixed bar 4. In order to lock a desired position of the fixed bar 4 within the elongated support tube 7, the first lock pin 19 is slidably engaged through a selected hole of the plurality of length-adjusting holes 18 and the first hole 17.

Various thicknesses of transoms are accommodated as the left brace assembly 1 and the right brace assembly 2 may each further comprise a threaded hole 20, and the swivel screw clamp 12 may comprise a threaded shaft 13, a knob 14, and a pad 15 seen in FIG. 1, FIG. 2, FIG. 3, FIG. 4, and FIG. 5. The threaded hole 20 allows the threaded shaft 13 to traverse through the free bar 5 while preserving the structural integrity of the free bar 5. The threaded shaft 13 engages with the threaded hole 20 so that the knob 14 may be rotated in order to tighten and loosen the pad 15 against the transom. The knob 14 provides a grip for a user to easily rotate the threaded shaft 13, and consequently extend towards or retract the pad 15 with the transom. In order for the swivel screw to press the transom against the fixed bar 4 and the elongated support tube 7, the threaded hole 20 laterally traverses through the free bar 5 and is positioned opposite the connecting bar 6 along the free bar 5. In order for the threaded shaft 13 to be rotated by a user, the knob 14 is terminally fixed with the threaded shaft 13, and the pad 15 is terminally fixed with the threaded shaft 13, opposite the knob 14. More specifically, the threaded shaft 13 is positioned normal with the pad 15. This arrangement maximizes the force and surface area of the pad 15 against the transom. In order to define the distance between the pad 15 and the free bar 5, the threaded shaft 13 is threadably engaged through the threaded hole 20. Moreover, as the transom is positioned between the free bar 5 and the fixed bar 4, the pad 15 is positioned in between the free bar 5 and the fixed bar 4.

The present invention may further uphold and transport a paddleboard, a kayak, or similar water sporting goods as the present invention may further comprise a cradle mechanism 45 seen in FIG. 1, FIG. 2, FIG. 3, and FIG. 5. The connector bar 21 houses the cradle mechanism 45 while not engaged with a paddleboard or a kayak as the connector bar 21 may comprise a base panel 22, a first lateral wall 23, a second lateral wall 24, a first tab 25, and a second tab 26. Furthermore, the cradle mechanism 45 may comprise a first telescopic bar 46 and a second telescopic bar 47. The base panel 22 connects the left brace assembly 1 with the right brace assembly 2. The first lateral wall 23 and the second lateral wall 24 surround the cradle mechanism 45 and structurally reinforce the connector bar 21. More specifically, the first telescopic bar 46 and the second telescopic bar 47 are positioned within the connector bar 21, across the first lateral wall 23 and the second lateral wall 24 while not engaged with a paddleboard and a kayak. The first tab 25 allows the base panel 22 to be mounted onto the left brace assembly 1, and the second tab 26 allows the base panel 22 to be mounted onto the second brace assembly. The first telescopic bar 46 and the second telescopic bar 47 uphold a paddleboard or a kayak and contours to the overall curvature of the base of the paddleboard or the kayak. In order for the first telescopic bar 46 and the second telescopic bar 47 to uphold various sized paddleboards and kayaks, the first telescopic bar 46 and the second telescopic bar 47 may each comprise a fixed end 48 and a free end 49. The fixed end 48 connects the first telescopic bar 46 and the second telescopic bar 47, respectively, with the connector bar 21. The free end 49 supports the outer edges of the paddleboard or the kayak. The left brace assembly 1 and the right brace assembly 2 are terminally positioned with the base panel 22 as the first tab 25 is terminally fixed with the base panel 22, and the second tab 26 is terminally fixed with the base panel 22, opposite the first tab 25. The connector bar 21 is secured as the first tab 25 is mounted onto the left brace assembly 1, and the second tab 26 is mounted onto the right brace assembly 2. In order to house the cradle mechanism 45 within the connector bar 21, the first lateral wall 23 is positioned opposite the second lateral wall 24 across the base panel 22. Moreover, the first lateral wall 23 and the second lateral wall 24 are laterally fixed along the base panel 22. In order for the cradle mechanism 45 to conform around underneath a paddleboard or a kayak, the fixed end 48 is rotatably connected in between the first lateral wall 23 and the second lateral wall 24, thereby creating a V-shape with the first telescopic bar 46 and the second telescopic bar 47, seen in FIG. 3. The paddleboard or the kayak is readily positioned within the cradle mechanism 45 as the free end 49 is positioned offset from the connector bar 21. While engaging the cradle mechanism 45 with a paddleboard or a kayak, the free bar 5 of the U-shaped bracket 3 is oriented away from the stopper plate 11 so that the U-shaped bracket 3 does not come into contact with the paddleboard or the kayak. The present invention is switched from a preferred configuration to this alternate configuration as the fixed bar 4 simply slides out of the open-end rim 8 of the elongated support tube 7 and reversed so that the free bar 5 is positioned away from the stopper plate 11. Once reversed, the fixed bar 4 slides back into the elongated support tube 7 through the open-end rim 8 and secured with the first lock pin 19.

In order for the cradle mechanism 45 to remain uninhibited by the wheel assembly 33, the elongated support tube 7 may comprise a first planar surface 9 and a second planar surface 10 seen in FIG. 1, FIG. 2, FIG. 3, FIG. 4, and FIG. 5. The first planar surface 9 is positioned opposite the second planar surface 10 about the elongated support tube 7. More specifically, the first planar surface 9 is oriented towards the wheel assembly 33. The connector bar 21 is flushed with the elongated support tube 7 of the left brace assembly 1 and the elongated support tube 7 of the right brace assembly 2 as the base panel 22 is positioned adjacent with the first planar surface 9. Furthermore, the first tab 25 is mounted onto the first planar surface 9 of the elongated support tube 7 of the left brace assembly 1, and the second tab 26 is mounted onto the first planar surface 9 of the elongated support tube 7 of the right brace assembly 2. The first telescopic bar 46 and the second telescopic bar 47 readily receive the paddleboard or the kayak as the first lateral wall 23 and the second lateral wall 24 are oriented towards the second planar surface 10.

In order for the cradle mechanism 45 to uphold paddleboards and kayaks of various widths, the first telescopic bar 46 and the second telescopic bar 47 may each comprise an inner bar 50 and an outer tube 51. seen in FIG. 1, FIG. 2, FIG. 3, and FIG. 5. The inner bar 50 positions and orients the outer tube 51. The outer tube 51 supports the sides of a paddleboard or a kayak. More specifically, the fixed end 48 is positioned coincident with the inner bar 50, and the free end 49 is positioned coincident with the outer tube 51. The overall length of the first telescopic bar 46 and the second telescopic bar 47 is adjustable as the inner bar 50 is telescopically engaged into the outer tube 51. A V-shape is defined with the rotation of the inner bar 50 as the fixed end 48 of the first telescopic bar 46 is positioned adjacent with the fixed end 48 of the second telescopic bar 47.

Furthermore, the cradle mechanism 45 may further comprise a second lock pin 52, a third lock pin 53, a plurality of first slots 54, and a plurality of second slots 54 to secure a desired angle between the first telescopic bar 46 and the second telescopic bar 47. As seen in FIG. 1, FIG. 2, FIG. 3, FIG. 4, and FIG. 5, the V-shape of the cradle assembly is widened and narrowed as the plurality of first slots 54 is positioned in between the fixed end 48 of the first telescopic bar 46 and the left brace assembly 1. Likewise, the plurality of second slots 54 is positioned in between the fixed end 48 of the second telescopic bar 47 and the right brace assembly 2. In order for a desired position of the second lock pin 52 and a desired position of the third lock pin 53 is secured along the connector bar 21, the plurality of first slots 54 and the plurality of second slots 54 traverse through the first lateral wall 23 and the second lateral wall 24. The first telescopic bar 46 rests on the second lock pin 52 while flipped out of the connector bar 21 as the second lock pin 52 is slidably engaged through a selected slot of the plurality of first slots 54. Likewise, the second telescopic bar 47 rest on the third lock pin 53 while flipped out of the connector bar 21 as the third lock pin 53 is slidably engaged through a selected slot of the plurality of second slots 54.

The first roller assembly 27 and the second roller assembly 28 may remain attached with a water vessel throughout use and transportation of the water vessel as the first roller assembly 27 and the second roller assembly 28 may each further comprise a main bolt 39, a second hole 40, a spring-loaded pin 41, and a plurality of angle-adjusting holes 44 seen in FIG. 1, FIG. 2, FIG. 3, FIG. 4, and FIG. 5. The main bolt 39 attaches the mounting plate 29 with the elongated support tube 7. The second hole 40 allows the main bolt 39 to engage the mounting plate 29 while preserving the structural integrity of the mounting plate 29. The spring-loaded pin 41 locks the position of the leg 32 with the mounting plate 29. The plurality of angle-adjusting holes 44 allows the spring-loaded pin 41 to engage the leg 32 with the mounting plate 29 while preserving the structural integrity of the mounting plate 29. The plurality of angle-adjusting holes 44 is preferably three holes such that the three holes provide an extended configuration, a neutral configuration, and a retracted configuration for the first roller assembly 27 with the left brace assembly 1 and the second roller assembly 28 with the right brace assembly 2. Furthermore, the mounting plate 29 may comprise a first edge 30 and a second edge 31. A height of the mounting plate 29 is defined as the first edge 30 is positioned opposite the second edge 31 across the mounting plate 29. More specifically, the first edge 30 is positioned adjacent with the elongated support tube 7, and the second edge 31 is positioned offset from the elongated support tube 7. This arrangement maximizes the distance between the second hole 40 and the plurality of angle-adjusting holes 44, and consequently the distance between each hole of the plurality of angle-adjusting holes 44 for a larger range of motion for the leg 32 around the mounting plate 29. As the leg 32 extends over the second edge 31, the plurality of angle-adjusting holes 44 is positioned adjacent with the second edge 31. The second hole 40 is positioned between the plurality of angle-adjusting holes 44 and the first edge 30 in order for the main bolt 39 to traverse through both the mounting plate 29 and the elongated support tube 7. In order for the leg 32 to be rotated around the main bolt 39 for each configuration, the plurality of angle-adjusting holes 44 is radially distributed around the second hole 40. The second hole 40 traverses from the mounting plate 29 and through the leg 32 for clear and continuous passage of the main bolt 39 through both the mounting plate 29 and the leg 32. The leg 32 remains connected with the mounting plate 29 while rotating around the main bolt 39 as the main bolt 39 is positioned through the second hole 40. The leg 32 is hingedly connected to the mounting plate 29 by the main bolt 39, thereby allowing the leg 32 to be oriented as needed. In order to release and secure the leg 32 with the mounting plate 29, the spring-loaded pin 41 is terminally integrated through the leg 32 and is engaged into a selected hole from the plurality of angle-adjusting holes 44.

In the preferred embodiment of the present invention, the spring-loaded pin 41 may comprise a knob end 42 and a locking end 43, seen in FIG. 1, FIG. 2, FIG. 3, FIG. 4, and FIG. 5. The knob end 42 provides a grip for a user to pull out the locking end 43 from the selected hole. The locking end 43 slides into and out of the selected hole. In order for the knob end 42 to be accessed by the user, the knob end 42 is externally positioned with the leg 32 and is positioned opposite the mounting plate 29 about the leg 32. The locking end 43 is positioned opposite the knob end 42 along the spring-loaded pin 41 as the locking end 43 engages with the mounting plate 29. The locking end 43 is engaged into the selected hole, thereby securing the desired position of the leg 32 with the mounting plate 29.

In the preferred embodiment of the present invention, the wheel assembly 33 may comprise a wheel body 34, a hub 35, an axle nut 36, a bearing 37, and a third hole 38 seen in FIG. 1, FIG. 2, FIG. 3, FIG. 4, and FIG. 5. The wheel body 34 presses and rolls across the ground. The wheel body 34 is preferably made of rubber material to absorb any shock and be resistant to any protrusions on the ground. The hub 35 stabilizes the wheel body 34 and mounts the wheel body 34 with the leg 32. The axle nut 36 connects the hub 35 with the leg 32. The bearing 37 locks the axle nut 36 with the hub 35. The third hole 38 allows the axle nut 36 to traverse though the hub 35 while preserving the structural integrity of the hub 35. In order to for the wheel assembly 33 to continuously roll across the ground, the wheel body 34 is fixed around the hub 35. The hub 35, and consequently the wheel body 34, rotates around the axle nut 36 as the third hole 38 centrally traverses through the hub 35. The hub 35 remains connected with the leg 32 by the axle nut 36 while rotating as the third hole 38 laterally traverses through the leg 32, and the axle nut 36 is positioned through the third hole 38. In order for the hub 35 to remain attached with the leg 32 throughout use, the bearing 37 is positioned adjacent with the leg 32, opposite the hub 35, and is threadably engaged with the axle nut 36. More specifically, the bearing 37 is positioned opposite the mounting plate 29 along the leg 32 to effectively support the weight of the water vessel.

Although the invention has been explained in relation to its preferred embodiment, it is to be understood that many other possible modifications and variations can be made without departing from the spirit and scope of the invention as hereinafter claimed.

What is claimed is:
1. A dolly for a water vessel comprising:
a left brace assembly;
a right brace assembly;
a connector bar;
a first roller assembly;
a second roller assembly;
the left brace assembly and the right brace assembly each comprising a U-shaped bracket, an elongated support tube, and a stopper plate;
the first roller assembly and the second roller assembly each comprising a mounting plate, a leg, and a wheel assembly;
the left brace assembly being positioned offset from the right brace assembly;
the connector bar being fixed in between the left brace assembly and the right brace assembly;
the U-shaped bracket being terminally mounted with the elongated support tube;
the stopper plate being terminally fixed with the elongated support tube, opposite the U-shaped bracket;
the U-shaped bracket being slidably engaged into the elongated support tube;
the mounting plate of the first roller assembly being laterally fixed with the elongated support tube of the left brace assembly, offset from the stopper plate of the left brace assembly;
the mounting plate of the second roller assembly being laterally fixed with the elongated support tube of the right brace assembly, offset from the stopper plate of the right brace assembly;
the leg being hingedly connected with the mounting plate;
the wheel assembly being positioned opposite to the mounting plate along the leg; and,
the wheel assembly being rotatably mounted with the leg.
2. The dolly for a water vessel as claimed in claim 1 comprising:
the left brace assembly and the right brace assembly each further comprising a swivel screw clamp and a locking mechanism;
the U-shaped bracket comprises a fixed bar, a free bar, and a connecting bar;
the elongated support tube comprising an open-end rim;
the fixed bar being terminally fixed with the connecting bar;
the free bar being terminally fixed with the connecting bar, opposite the fixed bar;
the open-end rim being positioned opposite the stopper plate along the elongated support tube;
the fixed bar being positioned into the open-end rim;
the swivel screw clamp being integrated into the U-shaped bracket; and,
the fixed bar being operatively coupled with the elongated support tube by the locking mechanism, wherein the locking mechanism is used to selectively lock the fixed bar in place within the elongated support tube at the desired position.
3. The dolly for a water vessel as claimed in claim 2 comprising:
the locking mechanism comprising a first hole, a plurality of length-adjusting holes, and a first lock pin;
the first hole laterally traversing through the elongated support tube;
the plurality of length-adjusting holes laterally traversing through the fixed bar;
the plurality of length-adjusting holes being distributed along the fixed bar; and,
the first lock pin being slidably engaged through a selected hole of the plurality of length-adjusting holes and the first hole.
4. The dolly for a water vessel as claimed in claim 3, wherein the first lock pin is a clevis pin.
5. The dolly for a water vessel as claimed in claim 2 comprising:

the left brace assembly and the right brace assembly each further comprising a threaded hole;
the swivel screw clamp comprising a threaded shaft, a knob, and a pad;
the threaded hole laterally traversing through the free bar;
the threaded hole being positioned opposite the connecting bar along the free bar;
the knob being terminally fixed with the threaded shaft;
the pad being terminally fixed with the threaded shaft, opposite the knob;
the threaded shaft being positioned normal with the pad;
the threaded shaft being threadably engaged through the threaded hole; and,
the pad being positioned in between the free bar and the fixed bar.

6. The dolly for a water vessel as claimed in claim 1 comprising:
a cradle mechanism;
the connector bar comprising a base panel, a first lateral wall, a second lateral wall, a first tab, and a second tab;
the cradle mechanism comprises a first telescopic bar and a second telescopic bar;
the first telescopic bar and the second telescopic bar each comprising a fixed end and a free end;
the first tab being terminally fixed with the base panel;
the second tab being terminally fixed with the base panel, opposite the first tab;
the first tab being mounted onto the left brace assembly;
the second tab being mounted onto the right brace assembly;
the first lateral wall being positioned opposite the second lateral wall across the base panel;
the first lateral wall and the second lateral wall being laterally fixed along the base panel;
the fixed end being rotatably connected in between the first lateral wall and the second lateral wall; and,
the free end being positioned offset from the connector bar.

7. The dolly for a water vessel as claimed in claim 6 comprising:
the elongated support tube comprising a first planar face and a second planar face;
the first planar face being positioned opposite the second planar face about the elongated support tube;
the first planar face being oriented towards the wheel assembly;
the base panel being positioned adjacent with the first planar face;
the first tab being mounted onto the first planar face of the elongated support tube of the left brace assembly;
the second tab being mounted onto the first planar face of the elongated support tube of the right brace assembly; and,
the first lateral wall and the second lateral wall being oriented towards the second planar face.

8. The dolly for a water vessel as claimed in claim 6 comprising:
the first telescopic bar and the second telescopic bar each comprising an inner bar and an outer tube;
the fixed end being positioned coincident with the inner bar;
the free end being positioned coincident with the outer tube;
the inner bar being telescopically engaged into the outer tube; and,
the fixed end of the first telescopic bar being positioned adjacent with the fixed end of the second telescopic bar.

9. The dolly for a water vessel as claimed in claim 6 comprising:
the cradle mechanism further comprising a second lock pin, a third lock pin, a plurality of first slots, and a plurality of second slots;
the plurality of first slots being positioned in between the fixed end of the first telescopic bar and the left brace assembly;
the plurality of second slots being positioned in between the fixed end of the second telescopic bar and the right brace assembly;
the plurality of first slots and the plurality of second slots traversing through the first lateral wall and the second lateral wall;
the second lock pin being slidably engaged through a selected slot of the plurality of first slots; and,
the third lock pin being slidably engaged through a selected slot of the plurality of second slots.

10. The dolly for a water vessel as claimed in claim 1 comprising:
the leg being positioned adjacent with the mounting plate, opposite the elongated support tube.

11. The dolly for a water vessel as claimed in claim 1 comprising:
the first roller assembly and the second roller assembly each further comprising a main bolt, a second hole, a spring-loaded pin, and a plurality of angle-adjusting holes;
the mounting plate comprises a first edge and a second edge;
the first edge being positioned opposite the second edge across the mounting plate;
the first edge being positioned adjacent with the elongated support tube;
the second edge being positioned offset from the elongated support tube;
the plurality of angle-adjusting holes being positioned adjacent with the second edge;
the second hole being positioned between the plurality of angle-adjusting holes and the first edge;
the plurality of angle-adjusting holes being radially distributed around the second hole;
the second hole traversing from the mounting plate and through the leg;
the main bolt being positioned through the second hole;
the leg being hingedly connected to the mounting plate by the main bolt;
the spring-loaded pin being terminally integrated through the leg; and,
the spring-loaded pin being engaged into a selected hole from the plurality of angle-adjusting holes.

12. The dolly for a water vessel as claimed in claim 11 comprising:
the spring-loaded pin comprising a knob end and a locking end;
the knob end being externally positioned with the leg;
the knob end being positioned opposite the mounting plate about the leg;
the locking end being positioned opposite the knob end along the spring-loaded pin; and,
the locking end being engaged into the selected hole.

13. The dolly for a water vessel as claimed in claim 11, wherein the plurality of angle-adjusting holes is three holes.

14. The dolly for a water vessel as claimed in claim 1 comprising:
the wheel assembly comprising a wheel body, a hub, an axle nut, a bearing, and a third hole;

the wheel body being fixed around the hub;
the third hole centrally traversing through the hub;
the third hole laterally traversing through the leg;
the axle nut being positioned through the third hole;
the bearing being positioned adjacent with the leg, opposite the hub;
the bearing being threadably engaged with the axle nut; and,
the bearing being positioned opposite the mounting plate along the leg.

15. A dolly for a water vessel comprising:
a left brace assembly;
a right brace assembly;
a connector bar;
a first roller assembly;
a second roller assembly;
the left brace assembly and the right brace assembly each comprising a U-shaped bracket, an elongated support tube, and a stopper plate;
the first roller assembly and the second roller assembly each comprising a mounting plate, a leg, a wheel assembly a main bolt, a second hole, a spring-loaded pin, and a plurality of angle-adjusting holes;
the mounting plate comprises a first edge and a second edge;
the spring-loaded pin comprising a knob end and a locking end;
the left brace assembly being positioned offset from the right brace assembly;
the connector bar being fixed in between the left brace assembly and the right brace assembly;
the U-shaped bracket being terminally mounted with the elongated support tube;
the stopper plate being terminally fixed with the elongated support tube, opposite the U-shaped bracket;
the U-shaped bracket being slidably engaged into the elongated support tube;
the mounting plate of the first roller assembly being laterally fixed with the elongated support tube of the left brace assembly, offset from the stopper plate of the left brace assembly;
the mounting plate of the second roller assembly being laterally fixed with the elongated support tube of the right brace assembly, offset from the stopper plate of the right brace assembly;
the leg being hingedly connected with the mounting plate;
the wheel assembly being positioned opposite to the mounting plate along the leg;
the wheel assembly being rotatably mounted with the leg;
the leg being positioned adjacent with the mounting plate, opposite the elongated support tube;
the first edge being positioned opposite the second edge across the mounting plate;
the first edge being positioned adjacent with the elongated support tube;
the second edge being positioned offset from the elongated support tube;
the plurality of angle-adjusting holes being positioned adjacent with the second edge;
the second hole being positioned between the plurality of angle-adjusting holes and the first edge;
the plurality of angle-adjusting holes being radially distributed around the second hole;
the second hole traversing from the mounting plate and through the leg;
the main bolt being positioned through the second hole;
the leg being hingedly connected to the mounting plate by the main bolt;
the spring-loaded pin being terminally integrated through the leg;
the spring-loaded pin being engaged into a selected hole from the plurality of angle-adjusting holes;
the knob end being externally positioned with the leg;
the knob end being positioned opposite the mounting plate about the leg;
the locking end being positioned opposite the knob end along the spring-loaded pin; and,
the locking end being engaged into the selected hole.

16. The dolly for a water vessel as claimed in claim 15 comprising:
the locking mechanism comprising a first hole, a plurality of length-adjusting holes, and a first lock pin;
the left brace assembly and the right brace assembly each further comprising a swivel screw clamp, a locking mechanism, a threaded hole;
the U-shaped bracket comprises a fixed bar, a free bar, and a connecting bar;
the elongated support tube comprising an open-end rim;
the swivel screw clamp comprising a threaded shaft, a knob, and a pad;
the fixed bar being terminally fixed with the connecting bar;
the free bar being terminally fixed with the connecting bar, opposite the fixed bar;
the open-end rim being positioned opposite the stopper plate along the elongated support tube;
the fixed bar being positioned into the open-end rim;
the swivel screw clamp being integrated into the U-shaped bracket;
the fixed bar being operatively coupled with the elongated support tube by the locking mechanism, wherein the locking mechanism is used to selectively lock the fixed bar in place within the elongated support tube at the desired position;
the first hole laterally traversing through the elongated support tube;
the plurality of length-adjusting holes laterally traversing through the fixed bar;
the plurality of length-adjusting holes being distributed along the fixed bar;
the first lock pin being slidably engaged through a selected hole of the plurality of length-adjusting holes and the first hole;
the threaded hole laterally traversing through the free bar;
the threaded hole being positioned opposite the connecting bar along the free bar;
the knob being terminally fixed with the threaded shaft;
the pad being terminally fixed with the threaded shaft, opposite the knob;
the threaded shaft being positioned normal with the pad;
the threaded shaft being threadably engaged through the threaded hole; and,
the pad being positioned in between the free bar and the fixed bar.

17. The dolly for a water vessel as claimed in claim 16, wherein the first lock pin is a clevis pin.

18. The dolly for a water vessel as claimed in claim 15 comprising:
a cradle mechanism;
the connector bar comprising a base panel, a first lateral wall, a second lateral wall, a first tab, and a second tab;

the cradle mechanism comprises a first telescopic bar, a second telescopic bar, a second lock pin, a third lock pin, a plurality of first slots, and a plurality of second slots;

the first telescopic bar and the second telescopic bar each comprising a fixed end, a free end, an inner bar, and an outer tube;

the elongated support tube comprising a first planar face and a second planar face;

the first tab being terminally fixed with the base panel;

the second tab being terminally fixed with the base panel, opposite the first tab;

the first tab being mounted onto the left brace assembly;

the second tab being mounted onto the right brace assembly;

the first lateral wall being positioned opposite the second lateral wall across the base panel;

the first lateral wall and the second lateral wall being laterally fixed along the base panel;

the fixed end being rotatably connected in between the first lateral wall and the second lateral wall;

the free end being positioned offset from the connector bar;

the first planar face being positioned opposite the second planar face about the elongated support tube;

the first planar face being oriented towards the wheel assembly;

the base panel being positioned adjacent with the first planar face;

the first tab being mounted onto the first planar face of the elongated support tube of the left brace assembly;

the second tab being mounted onto the first planar face of the elongated support tube of the right brace assembly;

the first lateral wall and the second lateral wall being oriented towards the second planar face;

the fixed end being positioned coincident with the inner bar;

the free end being positioned coincident with the outer tube;

the inner bar being telescopically engaged into the outer tube;

the fixed end of the first telescopic bar being positioned adjacent with the fixed end of the second telescopic bar;

the plurality of first slots being positioned in between the fixed end of the first telescopic bar and the left brace assembly;

the plurality of second slots being positioned in between the fixed end of the second telescopic bar and the right brace assembly;

the plurality of first slots and the plurality of second slots traversing through the first lateral wall and the second lateral wall;

the second lock pin being slidably engaged through a selected slot of the plurality of first slots; and, the third lock pin being slidably engaged through a selected slot of the plurality of second slots.

19. The dolly for a water vessel as claimed in claim 15, wherein the plurality of angle-adjusting holes is three holes.

20. The dolly for a water vessel as claimed in claim 15 comprising:

the wheel assembly comprising a wheel body, a hub, an axle nut, a bearing, and a third hole;

the wheel body being fixed around the hub;

the third hole centrally traversing through the hub;

the third hole laterally traversing through the leg;

the axle nut being positioned through the third hole;

the bearing being positioned adjacent with the leg, opposite the hub;

the bearing being threadably engaged with the axle nut; and, the bearing being positioned opposite the mounting plate along the leg.

* * * * *